Jan. 31, 1939.  F. J. CHAMPLIN  2,145,709
CONTROL CIRCUIT
Filed May 17, 1938
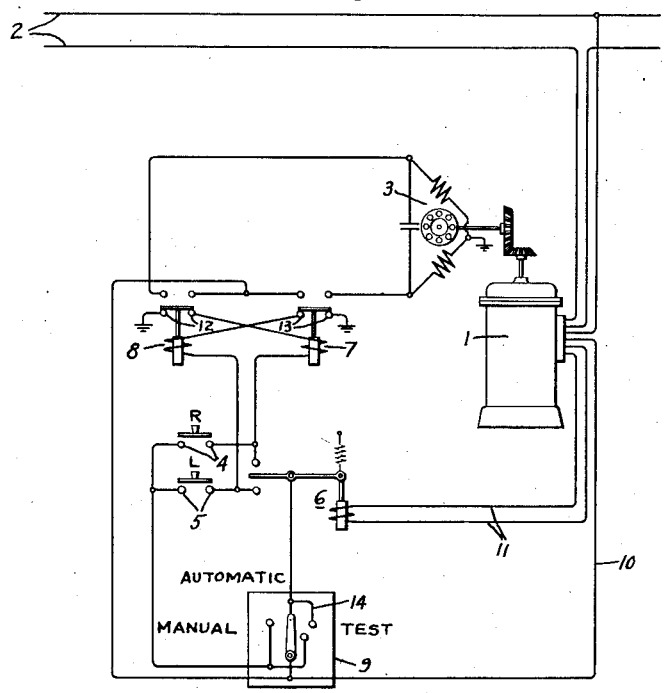
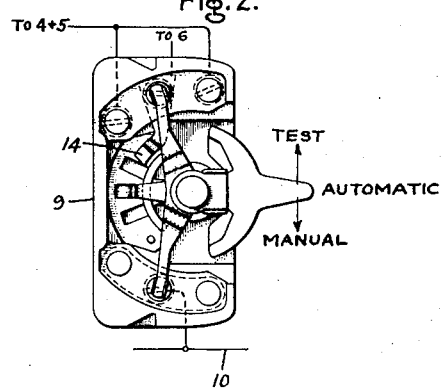
Inventor:
Franklin J. Champlin,
by Harry E Dunham
His Attorney.

ations of said regulator, and control means for selectively putting said regulator under the sole control of said manually operable means and under the sole control of said automatic means and under joint control of said manual and automatic means.

7. In a regulator system, a regulator which is selectively operable to raise or lower the value of a quantity to be regulated, manually operable means for selectively causing raising and lowering operations of said regulator, automatic means for selectively causing raising and lowering operations of said regulator, and means for selectively putting said regulator under the joint control of said manual and automatic means.

FRANKLIN J. CHAMPLIN.

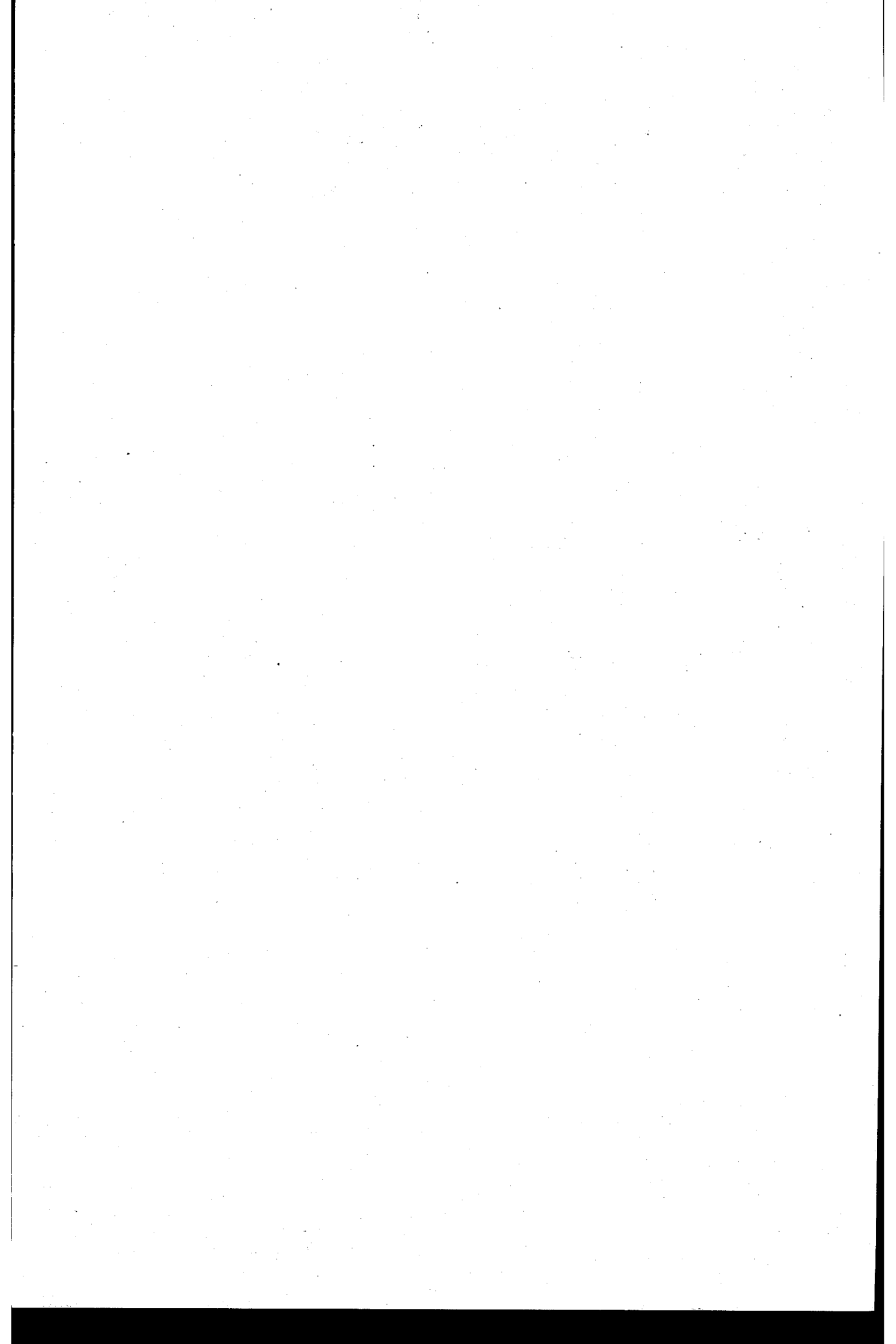

Patented Jan. 31, 1939

2,145,709

UNITED STATES PATENT OFFICE 2,145,709

CONTROL CIRCUIT

Franklin J. Champlin, Dalton, Mass., assignor to General Electric Company, a corporation of New York Application May 17, 1938, Serial No. 208,399

7 Claims. (Cl. 171—119)

This invention relates to control circuits and more particularly to improvements in control circuits for electrical regulators.

Electrical regulators are often provided with selective manual and automatic control. In accordance with this invention I provide a novel and useful combination of these two types of control into a third type of control which may be referred to as a test control. With this test control the regulator may be operated manually in either direction and then by merely releasing the manual control means the automatic control of the regulator will instantaneously be restored and the regulator will be run back under the automatic control if the manual operation was sufficient to cause automatic response. In this manner, the proper operation of a regulator for either or both directions of operation may be quickly and readily tested.

An object of the invention is to provide a new and improved control circuit.

Another object of the invention is to provide a new and improved electrical regulator test circuit.

The invention will be better understood from the following description taken in connection with the accompanying drawing and its scope will be pointed out in the appended claims.

In the drawing Fig. 1 is a diagrammatic illustration of an embodiment of my invention and Fig. 2 is a detail view of a form of control switch suitable for use with my invention.

Referring now to the drawing, and more particularly to Fig. 1, I show, by way of example, an induction voltage regulator 1 connected to regulate the voltage of an alternating current power circuit 2. The regulator is provided with a reversible driving motor 3 which is selectively controllable manually by raise and lower push buttons 4 and 5 or automatically by a voltage regulating relay 6. Interposed between the manual and automatic controlling means are auxiliary raise and lower relays 7 and 8 respectively.

The selective control of manual or automatic regulation is obtained by a three-position control switch 9. The first two positions of the switch provide respectively for manual and automatic regulation while the third position provides for testing operation.

Energy for operating the motor 3 and the relays 7 and 8 is obtained from inside the regulator 1. This supply circuit has a grounded return and a live conductor 10 coming out of the regulator. The voltage regulating relay 6 is also energized in accordance with the voltage of circuit 2 from within the regulator 1 and it is connected thereto by circuit 11.

Assume that main circuit 2 is energized in the usual way.

The manual operation of the circuit is as follows. Assume the control switch is in its left hand or manual position. If now the raise push button 4 is closed, a circuit is completed from the conductor 10 through the switch 9, the push button 4, the raise relay 7 and to ground through a set of interlock contacts 12 on the lowering relay 8. This causes relay 7 to pick up and close its main contacts, thus, completing a circuit from the conductor 10 to the motor 3 and back to ground, and thus causing the motor to operate in such a direction as to make the regulator raise the voltage of the main circuit. As soon as the push button 4 is released, relay 7 drops out and the motor stops. Similarly, when push button 5 is depressed the lowering relay 8 will be energized through a set of normally closed interlock contacts 13 on the raise relay 7. The operation of lowering relay 8 will complete a circuit through conductor 10 through its main contacts. Such will energize the motor 3 for reverse operation, thereby causing the push button to lower the voltage of circuit 3. This action will continue until the push button is released.

During this manual operation the voltage regulating relay will, of course, respond to the circuit voltage and will close one or the other of its sets of contacts depending upon how the voltage departs from the normal value for which the relay is set. However, this will have no effect on the operation because the control circuit through the regulating relay contacts is opened by the control switch.

If automatic operation is desired the control switch is moved to its middle or automatic position, thus, breaking the connection between the conductor 10 and the manual push buttons and completing the connection between the conductor 10 and the common contact beam of the regulating relay. If now the voltage of circuit 2 rises or falls, the regulating relay will close one or the other of its sets of contacts thereby energizing the auxiliary relays 7 or 8 and causing proper operation of the regulator in a manner described in connection with the manual operation. Such automatic operation will continue until the voltage is restored to normal whereupon the relay will have both of its sets of contacts open and the motor will come to rest.

If now it is desired to test the complete regulator control circuit for both manual and auto-